(12) United States Patent
Yamasaki et al.

(10) Patent No.: US 7,914,677 B2
(45) Date of Patent: Mar. 29, 2011

(54) WATER TREATMENT APPARATUS AND WATER TREATMENT METHOD

(75) Inventors: Kazuyuki Yamasaki, Hiroshima (JP); Kazuyuki Sakata, Fukuyama (JP); Kazumi Chuhjoh, Takamatsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 503 days.

(21) Appl. No.: 11/991,944

(22) PCT Filed: Feb. 28, 2006

(86) PCT No.: PCT/JP2006/303667
§ 371 (c)(1),
(2), (4) Date: Mar. 12, 2008

(87) PCT Pub. No.: WO2007/032104
PCT Pub. Date: Mar. 22, 2007

(65) Prior Publication Data
US 2009/0266763 A1    Oct. 29, 2009

(30) Foreign Application Priority Data
Sep. 14, 2005   (JP) .................................. 2005-266631

(51) Int. Cl.
*C02F 3/02* (2006.01)
(52) U.S. Cl. ..... 210/615; 210/151; 210/192; 210/195.2; 210/202; 210/206; 210/259; 210/321.69; 210/636; 210/639; 210/650; 210/652; 210/669; 210/748.1; 210/748.14; 210/805; 210/806; 210/616; 210/620
(58) Field of Classification Search .................. 210/190, 210/192, 195.1, 195.2, 199, 202, 205, 206, 210/208, 209, 219, 259, 266, 321.6, 748.01, 210/748.1, 748.12, 748.14, 748.16, 748.2, 210/754, 650, 652, 663, 669, 749, 805, 806, 150, 151, 631, 321.69, 615, 616, 636, 639, 620
See application file for complete search history.

(56) References Cited

U.S. PATENT DOCUMENTS
4,179,347 A * 12/1979 Krause et al. ................. 205/743
(Continued)

FOREIGN PATENT DOCUMENTS
JP            63-115497 U        7/1988
(Continued)

OTHER PUBLICATIONS
The International Search Report for International Application No. PCT/JP2006/303667 (2 pages).

*Primary Examiner* — Joseph W Drodge
(74) *Attorney, Agent, or Firm* — Edwards Angell Palmer & Dodge LLP; David G. Conlin; Lisa Swiszcz

(57) ABSTRACT

Water (23) that contains micro-nano bubbles generated in a micro-nano bubble generation tank (6) is introduced and treated in a charcoal water tank (ii) which is filled with a charcoal (15) and in which an air diffusing pipe (12) is placed and thereafter introduced and treated in a membrane device (21). Thus, activities of microorganisms propagating in the charcoal (15) are increased by the micro-nano bubbles, markedly increasing ability of decomposing organic matters in the water. Therefore, a clogging phenomenon due to the organic matters can be prevented by reducing organic loads on the membrane device (21). Moreover, a very small amount of alcohols or salts are added as a micro-nano bubble generation aid to the micro-nano bubble generation tank (6), improving an incidence rate of the micro-nano bubbles. The alcohols and salts are easily decomposed by the charcoal water tank (ii) and easily removed by the membrane device (21).

12 Claims, 8 Drawing Sheets

U.S. PATENT DOCUMENTS

| | | | |
|---|---|---|---|
| 4,956,093 A * | 9/1990 | Pirbazari et al. | 210/616 |
| 5,578,214 A | 11/1996 | Yamasaki et al. | |
| 6,056,876 A | 5/2000 | Yamasaki et al. | |
| 6,177,005 B1 | 1/2001 | Yamasaki et al. | |
| 6,261,456 B1 * | 7/2001 | Yamasaki et al. | 210/605 |
| 6,312,605 B1 * | 11/2001 | Kerfoot | 210/741 |
| 6,461,511 B1 | 10/2002 | Baba et al. | |
| 7,485,231 B2 * | 2/2009 | Yeom et al. | 210/608 |
| 2006/0054205 A1 | 3/2006 | Yabe et al. | |
| 2006/0284325 A1 | 12/2006 | Kohama et al. | |

FOREIGN PATENT DOCUMENTS

| | | | |
|---|---|---|---|
| JP | 4-35793 A | 2/1992 | |
| JP | 8-99092 A | 4/1996 | |
| JP | 9-271793 A | 10/1997 | |
| JP | 9-294996 A | 11/1997 | |
| JP | 9-314163 A | 12/1997 | |
| JP | 11-114596 A | 4/1999 | |
| JP | 2001-205290 A | 7/2001 | |
| JP | 2002-143885 A | 5/2002 | |
| JP | 2003-334548 A | 11/2003 | |
| JP | 2004-121962 A | 4/2004 | |
| JP | 2005-95818 A | 4/2005 | |
| JP | 2005-131450 A | 5/2005 | |
| JP | 2005-169359 A | 6/2005 | |

* cited by examiner

WATER TREATMENT APPARATUS AND WATER TREATMENT METHOD

TECHNICAL FIELD

The present invention relates to a water treatment apparatus including a membrane device that carries out water treatment using a membrane and a pretreatment device that carries out pretreatment of water to be introduced into the membrane device and a water treatment method.

BACKGROUND ART

In the treatment apparatus and treatment method of water treatment, there have conventionally been several pretreatment devices and pretreatment methods as general pretreatment devices and pretreatment methods. As one example, a pretreatment device of a biological treatment device in waste water treatment includes settling, filtering, pH adjustment, ozone oxidation, adsorption and so on.

The purpose of the pretreatment device is to reduce the biological, chemical or physical load on the waste water treatment apparatus in the subsequent step, and a reduction in the scale of the waste water treatment apparatus, a reduction in the running cost, an improvement in the water quality of the water to be treated from the waste water treatment apparatus and so on are expected.

However, the conventional pretreatment does not have the function of maintaining a high dissolved oxygen concentration to the subsequent step for a long time by markedly raising the dissolved oxygen concentration in the water to be treated to carry out the treatment with improved activities of microorganisms. Furthermore, the conventional pretreatment does not have the function of improving the functions of the microorganisms by markedly raising the dissolved oxygen concentration in the water to be treated and markedly raising the treatment efficiency of the membrane device in the subsequent stage.

Moreover, the conventional pretreatment, which has general aeration with a blower, does not have a treatment function with micro-nano bubbles that contain both micro bubbles of a diameter of not greater than 50 microns and not smaller than one micron and nano bubbles of a diameter of not greater than one micron. It is noted that, in the case of the pretreatment with the micro-nano bubbles described above, there is the function of maintaining the dissolved oxygen to the subsequent step for a long time.

There have conventionally been nano bubble utilizing method and apparatus disclosed in JP 2004-121962 A. The nano bubble utilizing method and apparatus utilize the characteristics of surface-activating operation, sterilizing operation and so on by the achievement of a reduction in buoyancy, an increase in surface area, an increase in surface activity, generation of a local high-pressure field and electrostatic polarization, which are owned by nano bubbles. More concretely, it is disclosed that the characteristics are correlated to allow a variety of objects to be cleaned with a high function and a low environmental load by a dirt component adsorption function, an object surface high-speed cleaning function and a sterilizing function and to allow the contaminated water to be cleaned.

However, (1) There is no disclosure of introducing and treating the water that contains the micro-nano-bubbles in a water tank which is filled with a charcoal or a synthetic charcoal and has an agitating device and thereafter introducing and treating the water in a membrane device.

(2) There is also no disclosure of newly generating water that contains the micro-nano bubbles in a micro-nano bubble generation tank, introducing the water that contains the micro-nano bubbles into a charcoal water tank which is filled with a charcoal or a synthetic charcoal and has an agitating device therein, carrying out treatment with raised activity of the microorganisms propagating in the charcoal or synthetic charcoal by the micro-nano bubbles and reducing the organic loads and so on of the membrane device.

Furthermore, there is a nano bubble generating method disclosed in JP 2003-334548 A. The nano bubble generating method, for use in a liquid, is constituted of (a) a step of decomposing and gasifying part of the liquid, (b) a step of applying ultrasonic waves in the liquid or (c) a step of decomposing and gasifying part of the liquid and applying ultrasonic waves.

However, (3) There is also no disclosure of introducing and treating the water that contains the micro-nano bubbles in a water tank which is filled with a charcoal or a synthetic charcoal and has an agitating device and thereafter introducing and treating the water in a membrane device.

(4) There is also no disclosure of newly generating water that contains the micro-nano bubbles in a micro-nano bubble generation tank, introducing the water that contains the micro-nano bubbles into a charcoal water tank which is filled with a charcoal or a synthetic charcoal and has an agitating device in the water tank, carrying out treatment with raised activity of the microorganisms propagating in the charcoal or synthetic charcoal by the micro-nano bubbles and reducing the organic loads and so on of the membrane device.

As described above, there have conventionally been apparatuses of various systems as the pretreatment device of the membrane device, there is existing no pretreatment device capable of markedly preventing the clogging phenomenon of the membrane device and improving the ability of the membrane device by utilizing a simple apparatus that is low cost and ensures easy maintenance and energy saving.

SUMMARY OF THE INVENTION

It is an object of the present invention to provide a water treatment apparatus and a water treatment method capable of carrying out treatment by raising the activity of the microorganisms propagating in a charcoal or a synthetic charcoal and reducing the organic loads and so on of a membrane device in a subsequent step.

In order to solve the above problems, a water treatment apparatus of the present invention comprises:

a membrane device that treats introduced water by means of a membrane; and a pretreatment device that carries out pretreatment of water to be introduced into the membrane device; wherein the pretreatment device comprises:

a raw water tank which is filled with polyvinylidene chloride filler and into which water is introduced from outside;

a micro-nano bubble generation tank which has a micro-nano bubble generator that generates micro-nano bubbles including both of micro bubbles and nano bubbles and makes the water introduced from the raw water tank contain the micro-nano bubbles;

a water returning device that sends part of the water in the micro-nano bubble generation tank back to the raw water tank; and a charcoal water tank which has agitating devices and is filled with a charcoal or a synthetic charcoal to treat the water introduced from the micro-nano bubble generation tank.

According to the above construction, part of the water in the micro-nano bubble generation tank is sent back to the raw water tank by the water returning device. Therefore, microorganisms propagating in the polyvinylidene chloride filler loaded in the raw water tank are activated by the micro-nano bubbles. Further, water is introduced from the micro-nano bubble generation tank into the charcoal water tank. Therefore, microorganisms propagating in the charcoal or the synthetic charcoal loaded in the charcoal water tank are also activated. As a result, organic matters in the water to be treated are effectively decomposed and treated by the activated microorganisms, and clogging of the membrane in the membrane device in the subsequent stage can be prevented.

That is, according to the present invention, the running cost can be reduced by reducing the frequency of replacement of the membrane in the membrane device.

One embodiment comprises a micro-nano bubble generation aid tank in which a micro-nano bubble generation aid to be added to the micro-nano bubble generation tank is reserved.

According to the embodiment, the micro-nano bubble generation aid reserved in the micro-nano bubble generation aid tank is added to the micro-nano bubble generation tank. Therefore, the micro-nano bubbles can be generated effectively and efficiently in the micro-nano bubble generation tank.

In one embodiment, the micro-nano bubble generation aid is alcohols or salts.

According to the embodiment, the alcohols or salts are used as the micro-nano bubble generation aid, and therefore, the micro-nano bubble generation aid can be procured inexpensively. Furthermore, by adding the alcohols or salts to the water to be treated, the incidence rate of the micro-nano bubbles can be improved up to about 100%. Furthermore, the alcohols and salts, which are simply decomposed in the charcoal water tank and easily removed by the membrane device in the subsequent stage, therefore exert no bad influence on the membrane device.

One embodiment comprises an activated carbon adsorption device in a stage subsequent to the charcoal water tank of the pretreatment device.

According to the embodiment, the activated carbon adsorption device is provided in the stage subsequent to the charcoal water tank filled with the charcoal or the synthetic charcoal, and therefore, two-stage treatment by charcoal becomes possible in the pretreatment device. Therefore, the organic matters in the water to be treated can be reliably treated, and the clogging of the membrane of the membrane device can be prevented more reliably. In particular, the microorganisms of which the microbial activity is increased by the micro-nano bubbles are propagating in the charcoal or the synthetic charcoal and the activated carbon, and the organic matter adsorbing treatment by charcoals (charcoal, synthetic charcoal, activated carbon) and the decomposition of the adsorbed organic matters by the microorganisms are linked together to markedly increase the organic matter decomposing ability.

Moreover, in the water treatment apparatus of one embodiment, the membrane device placed in the stage subsequent to the charcoal water tank includes any one of the ultrafiltration membrane device, the microfiltration membrane device and the reverse osmosis membrane device.

According to the embodiment, the organic matters in the water to be introduced into the ultrafiltration membrane device, the microfiltration membrane device, the reverse osmosis membrane device or the like are effectively decomposed. Therefore, the clogging of the membrane in the ultrafiltration membrane device, the microfiltration membrane device, the reverse osmosis membrane device or the like can be prevented. Furthermore, the micro-nano bubbles have the characteristic that they continuously stay in the water. Therefore, the cleaning effect on the membranes of the various membrane devices is improved by the micro-nano bubbles staying in the water to be treated, and the clogging of the membranes can further be effectively prevented.

In one embodiment, the membrane device placed in the stage subsequent to the activated carbon adsorption device includes any one of the ultrafiltration membrane device, the microfiltration membrane device and the reverse osmosis membrane device.

According to the embodiment, the organic matters in the water to be introduced into the ultrafiltration membrane device, the microfiltration membrane device, the reverse osmosis membrane device or the like are reliably decomposed by the two-stage treatment by the charcoals. Therefore, the clogging of the membrane in the ultrafiltration membrane device, the microfiltration membrane device, the reverse osmosis membrane device or the like can be prevented more reliably. Furthermore, the micro-nano bubbles have the characteristic that they continuously stay in the water. Therefore, the cleaning effect on the membranes of the various membrane devices is improved by the micro-nano bubbles staying in the water to be treated, and the clogging of the membranes can further be effectively prevented.

One embodiment constitutes part of an ultrapure water producing device or a waste water recycling device.

According to the embodiment, in the water used for manufacturing ultrapure water or for recycling the waste water in the ultrapure water producing device or the waste water recycling device, the organic matters are effectively treated through decomposition by the pretreatment device and the membrane device. Therefore, an ultrapure water of a good water quality or a recycle water of a good water quality can be obtained.

Moreover, the water treatment method of the present invention comprises the steps of:

introducing and treating water that contains micro-nano bubbles including both of micro bubbles and nano bubbles into a water tank which has agitating devices and is filled with a charcoal or a synthetic charcoal; and introducing the water treated by the water tank into a membrane device and carrying out treatment by means of a membrane by the membrane device.

According to the above constitution, microorganisms propagating in the charcoal or the synthetic charcoal are activated by the micro-nano bubbles in the water tank filled with the charcoal or the synthetic charcoal. Therefore, organic matters in the water to be treated are effectively treated through decomposition by the activated microorganisms, and clogging of the membrane in the membrane device in the subsequent stage can be prevented.

In one embodiment, the membrane device is any one of an ultrafiltration membrane device, a microfiltration membrane device and a reverse osmosis membrane device.

According to the embodiment, the organic matters in the water to be introduced into the ultrafiltration membrane device, the microfiltration membrane device, the reverse osmosis membrane device or the like are effectively decomposed. Therefore, the clogging of the membrane in the ultrafiltration membrane device, the microfiltration membrane device, the reverse osmosis membrane device or the like can be prevented. Furthermore, the micro-nano bubbles have the characteristic that they continuously stay in the water. Therefore, the cleaning effect on the membranes of the various membrane devices is improved by the micro-nano bubbles staying in the water to be treated, and the clogging of the membranes can further be effectively prevented.

In one embodiment, the charcoal loaded in the water tank is bincho charcoal, and the water treated by the membrane device is treated by a photocatalyst tank.

According to the embodiment, both the microorganisms propagating in the bincho charcoal loaded in the water tank and the photocatalyst tank placed in the stage subsequent to the membrane device have the functions of treating the organic matters. Therefore, the organic matter concentration in the water to be treated can be reduced as far as possible.

In one embodiment, any one of waste water, recycle water and service water before undergoing various treatments is used as the water.

According to the embodiment, the water to be subjected to treatment is any one of the waste water, the recycle water and the service water before undergoing various treatments. Therefore, all sorts of water can be treated.

In one embodiment, the charcoal loaded in the water tank is bincho charcoal, and the water treated by the membrane device is treated by an ultraviolet irradiation tank or an ultraviolet irradiation device.

According to the embodiment, both the microorganisms propagating in the bincho charcoal loaded in the water tank and the photocatalyst tank or the ultraviolet irradiation device placed in the stage subsequent to the ultraviolet irradiation tank have the functions of treating the organic matters. Therefore, the organic matter concentration in the water to be treated can be reduced as far as possible.

One embodiment constitutes part of an ultrapure water manufacturing method or a waste water recycling method.

According to the embodiment, in the water used for manufacturing ultrapure water or for recycling the waste water, the organic matters are effectively treated through decomposition by the water tank and the membrane device. Therefore, an ultrapure water of a good water quality or a recycle water of a good water quality can be obtained.

As is apparent from the above, the water treatment apparatus of the present invention introduces the water in the micro-nano bubble generation tank into the charcoal water tank filled with the charcoal or the synthetic charcoal and sends part of the water in the micro-nano bubble generation tank back to the raw water tank by the water returning device. Therefore, the microorganisms propagating in the charcoal or the synthetic charcoal loaded in the charcoal water tank are activated by the micro-nano bubbles. Furthermore, the microorganisms propagating in the polyvinylidene chloride filler loaded in the raw water tank are also activated. Therefore, the organic matters in the water to be treated are effectively treated through decomposition by the activated microorganisms, and the clogging of the membrane of the membrane device in the subsequent stage can be prevented.

That is, according to the present invention, the running cost can be reduced by reducing the frequency of replacement of the membrane in the membrane device.

Moreover, the water treatment method of the present invention, which activates the microorganisms propagating in the charcoal or the synthetic charcoal by the micro-nano bubbles in the water tank filled with the charcoal or the synthetic charcoal, is therefore able to effectively treat by decomposition the organic matters in the water to be treated by the activated microorganisms and to prevent the clogging of the membrane in the membrane device in the subsequent stage.

REFERENCE NUMERALS

Figure 1:
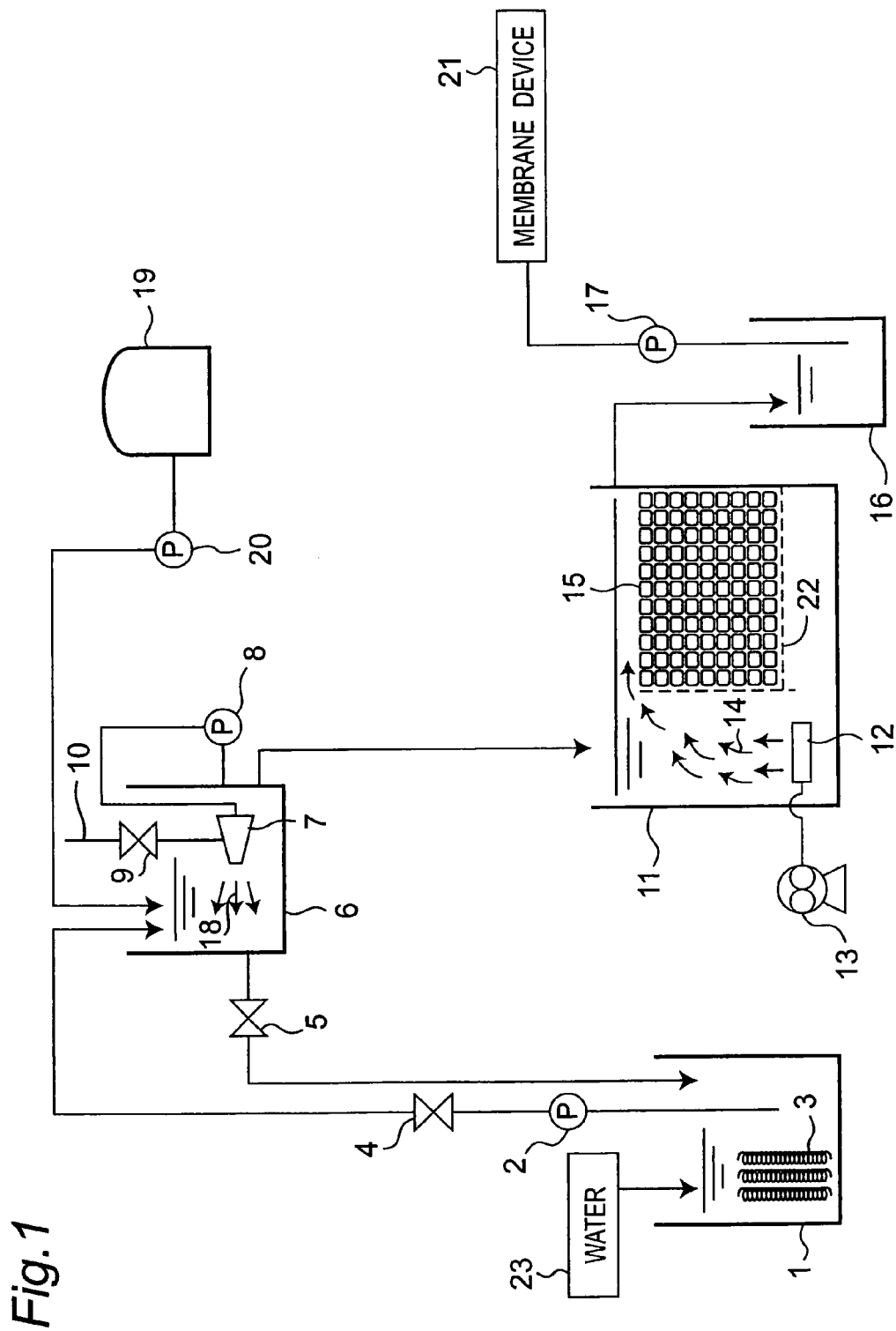
FIG. 1 is a view showing construction of a water treatment apparatus of the present invention.

1: raw water tank
2, 17, 37: pump
3: polyvinylidene chloride filler
4, 5, 9: valve
6: micro-nano bubble generation tank
7: micro-nano bubble generator
8: circulating pump
10: air suction pipe
11: charcoal water tank
12: air diffusing pipe
13: blower
15: charcoal
16, 36: pit
19: micro-nano bubble generation aid tank
20: proportioning pump
21: membrane device
22: wire net
25: ultrafiltration membrane device
26: photocatalyst tank
27: ultrapure water producing device
29: microfiltration membrane device
31: reverse osmosis membrane device
33: cooling tower
35: activated carbon adsorption device
40: ultraviolet irradiation tank

DETAILED DESCRIPTION OF THE INVENTION

The present invention will now be described in detail by embodiments shown in the drawings.

First Embodiment

FIG. 1 shows the schematic construction of a water treatment apparatus of the present embodiment. In FIG. 1, a reference numeral 1 denotes a raw water tank of a liquid, and a pump 2 that pumps up the liquid is provided. It is herein noted that the liquid in the present embodiment is defined widely as "water" 23. It is noted that the "water" 23, of course, includes "service water" and "waste water".

The raw water tank 1 is internally filled with a polyvinylidene chloride filler 3. Then, the water 23 introduced into the raw water tank 1 is discharged by the pump 2 with its discharge rate adjusted by a valve 4 and is introduced into a micro-nano bubble generation tank 6.

A micro-nano bubble generator 7 is placed in the micro-nano bubble generation tank 6, and micro-nano bubbles are generated by the micro-nano bubble generator 7, generating micro-nano bubble streams 18 in the micro-nano bubble generation tank 6.

A circulating pump 8 is placed outside the micro-nano bubble generation tank 6, and the water in the micro-nano bubble generation tank 6 is forcefully fed to the micro-nano bubble generator 7. As a result, the micro-nano bubble generator 7 generates micro-nano bubbles while taking in air supplied from an air suction pipe 10 connected to the micro-nano bubble generator 7. It is noted that a valve 9 is interposedly provided for the air suction pipe 10, and the air quantity is adjusted so that optimum micro-nano bubbles are easily generated.

Moreover, a micro-nano bubble generation aid from a micro-nano bubble generation aid tank 19 is quantitatively added to the micro-nano bubble generation tank 6 by a proportioning pump 20. In this case, a very small amount of alcohols or salts of common salt or the like are added in concrete as the micro-nano bubble generation aid in consideration of the influence of a membrane device 21 in the subsequent stage. Then, part of the water in the micro-nano bubble generation tank 6 is sent back to the raw water tank 1 by opening a valve 5.

Microorganisms propagate in the polyvinylidene chloride filler 3 loaded in the raw water tank 1 with a lapse of time. In the case, a greater number of active microorganisms propagate in the polyvinylidene chloride filler 3 by sending back the water that contains micro-nano bubbles from the micro-nano bubble generation tank 6, and pretreatment of the water is to be carried out by the greater number of active microorganisms.

The water 23 that contains the micro-nano bubbles generated in the micro-nano bubble generation tank 6 as described above is subsequently introduced into a charcoal water tank 11. The charcoal water tank 11 has a wire net 22 therein and the wire net 22 is filled with numbers of charcoal pieces 15. Then, an air diffusing pipe 12 is placed in a lower position inside the charcoal water tank 11 so that the water 23 that contains the micro-nano bubbles and the charcoal pieces 15 are efficiently brought in contact with each other by streams of water. By discharging air from a blower 13 through the air diffusing pipe 12, the inside of the tank is aerated. Thus, streams of water 14 are generated by the aeration of the inside of the charcoal water tank 11, so that the water 23 containing the micro-nano bubbles and the charcoal pieces 15 can efficiently be brought in contact with each other.

The charcoal 15 have various kinds, and bincho charcoal that has an appropriate hardness and a specific gravity larger than "1" without being damaged by aeration are used. A state in which the charcoal 15 is sunk inside the wire net 22 can be maintained when the charcoal 15 have a specific gravity of not smaller than one, and this is therefore convenient. Since the charcoal 15 as a natural material has pores, the microorganisms propagate in the pores. Further, the microorganisms also propagate on the surface of the charcoal 15. Then, the organic matters in the water 23 that contains the micro-nano bubbles are treated through decomposition by the microorganisms. In the case, due to the existence of the micro-nano bubbles in the water 23, the activities of the microorganisms propagating on the surface and in the pores of the charcoal 15 increase, and the ability to treat the organic matters in the water 23 through decomposition is markedly increased.

Moreover, the charcoal 15 also has an ability to adsorb the organic matters. Then, the charcoals 15 repeat the adsorption and decomposition of the organic matters since the adsorbed organic matters are treated through decomposition by the microorganisms propagating in the pores, and the adsorbing ability of the charcoal 15 becomes apparently not deteriorated. Thereafter, the water (water to be treated) 23 of which the organic matters have been treated through decomposition is introduced into a pit 16. The water 23 to be treated in the pit 16 is subsequently introduced into the membrane device 21 by a pump 17.

There is (1) a microfiltration membrane device, (2) an ultrafiltration membrane device or (3) a reverse osmosis membrane device as a concrete example of the membrane device 21. It is proper to select a device among the devices (1) through (3) according to the purpose and adopt the same as the membrane device 21.

As described above, in the present embodiment, the water 23 that contains the micro-nano bubbles generated in the micro-nano bubble generation tank 6 is treated by being introduced into the charcoal water tank 11 which is internally filled with the charcoal pieces 15 and in which the agitating device constituted of the blower 13 and the air diffusing pipe 12 is placed and thereafter treated by being introduced into the membrane device 21. Therefore, the micro-nano bubbles increase the activities of the microorganisms propagating in the charcoal 15, so that the ability to treat the organic matters in the water through decomposition can be markedly increased. As a result, the clogging phenomenon due to the organic matters in the membrane device 21 of the microfiltration membrane device, the ultrafiltration membrane device or the reverse osmosis membrane device can be prevented.

Moreover, a very small amount of alcohols and salts are added as the micro-nano bubble generation aid to the micro-nano bubble generation tank 6. Therefore, the incidence rate of the micro-nano bubbles with respect to the quantity of air supplied from the air suction pipe 10 can be improved up to about 100%. Furthermore, since the alcohols and salts are simply decomposed in the charcoal water tank 11 and easily removed by the membrane device 21 in the subsequent stage, no bad influence is exerted on the membrane device 21.

Second Embodiment

Figure 2:
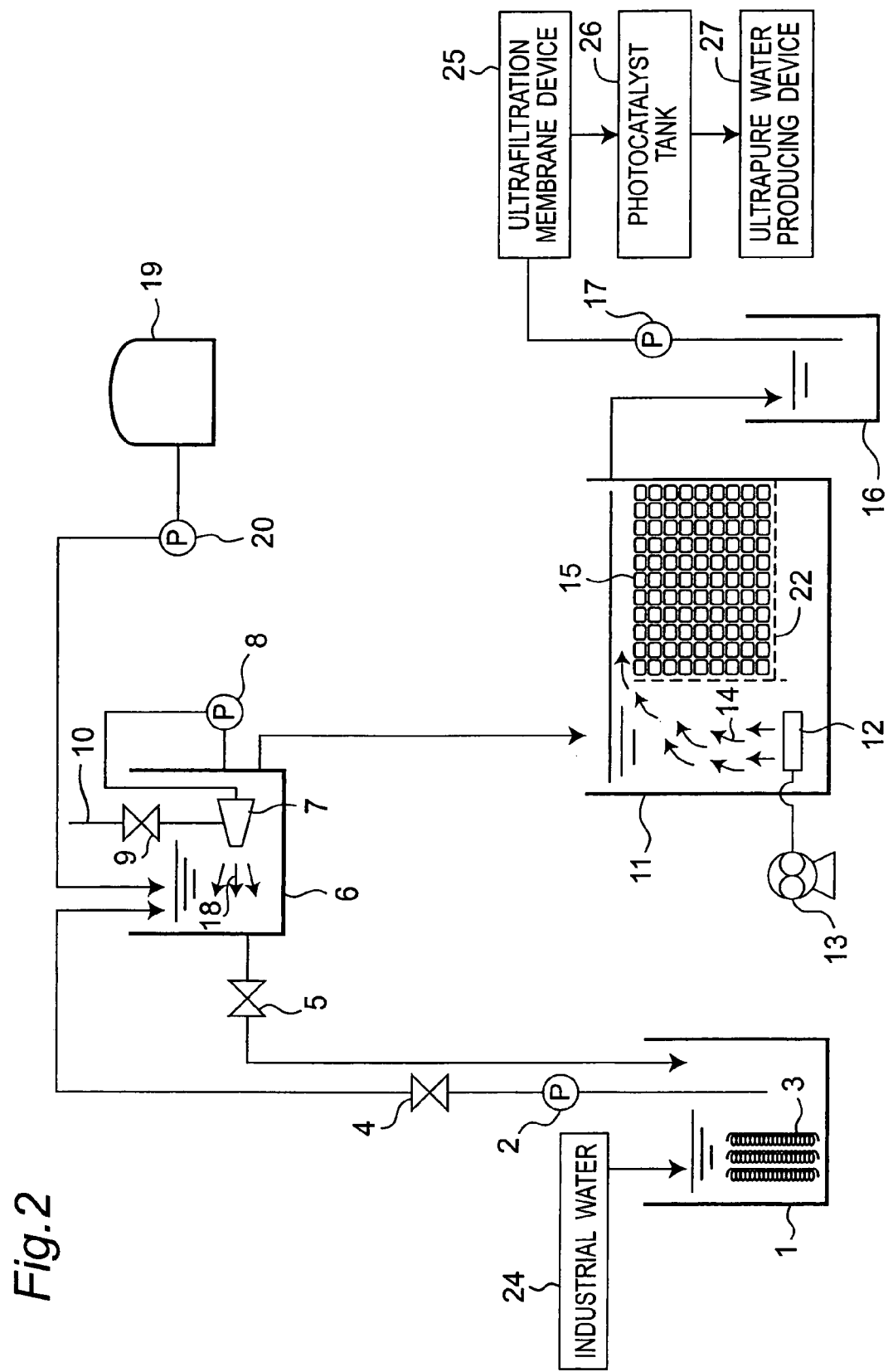
FIG. 2 is a view showing construction of a water treatment apparatus different from that of FIG. 1.

FIG. 2 shows the schematic construction of a water treatment apparatus of the present embodiment.

In contrast to the fact that the liquid supplied to the raw water tank 1 has been defined widely as the water 23 in the first embodiment, the liquid is limited to industrial water 24 in the present embodiment. Moreover, an ultrafiltration membrane device 25 is specifically employed as the membrane device 21 of the first embodiment. Furthermore, a photocatalyst tank 26 and an ultrapure water producing device 27 are arranged in this order following the ultrafiltration membrane device 25.

The components other than the above are the same as in the first embodiment and denoted by the same reference numerals as in the first embodiment with no detailed description provided therefor.

As described above, in the present embodiment, the liquid supplied to the raw water tank 1 is limited to the industrial water 24. Therefore, the present embodiment is a water treatment apparatus for the pretreatment of the industrial water 24. Furthermore, the ultrafiltration membrane device 25 is specifically employed as the membrane device 21 of the first embodiment, and the photocatalyst tank 26 and the ultrapure water producing device 27 are arranged in this order following the ultrafiltration membrane device 25. Therefore, the water 24 to be treated from the charcoal water tank 11 where the organic matters have been treated through decomposition is introduced in order of the ultrafiltration membrane device 25→the photocatalyst tank 26→the ultrapure water producing device 27.

That is, according to the present embodiment, the water quality is improved by carrying out the pretreatment of the industrial water 24 by using the micro-nano bubble technique, and the water 24 to be treated is introduced sequentially into the ultrafiltration membrane device 25, the photocatalyst tank 26 and the ultrapure water producing device 27.

With the above arrangement, by virtue of the feature that the micro-nano bubbles are maintained for a long time in the water 24 to be treated and the feature that the detergency for the membrane is maintained, the water 24 to be treated that has undergone the pretreatment by the micro-nano bubbles is able to not only prevent the clogging phenomenon of the membrane in the ultrafiltration membrane device 25 and the ultrapure water producing device 27 but also improve the throughput capacities of the ultrafiltration membrane device 25 and the ultrapure water producing device 27.

Third Embodiment

Figure 3:
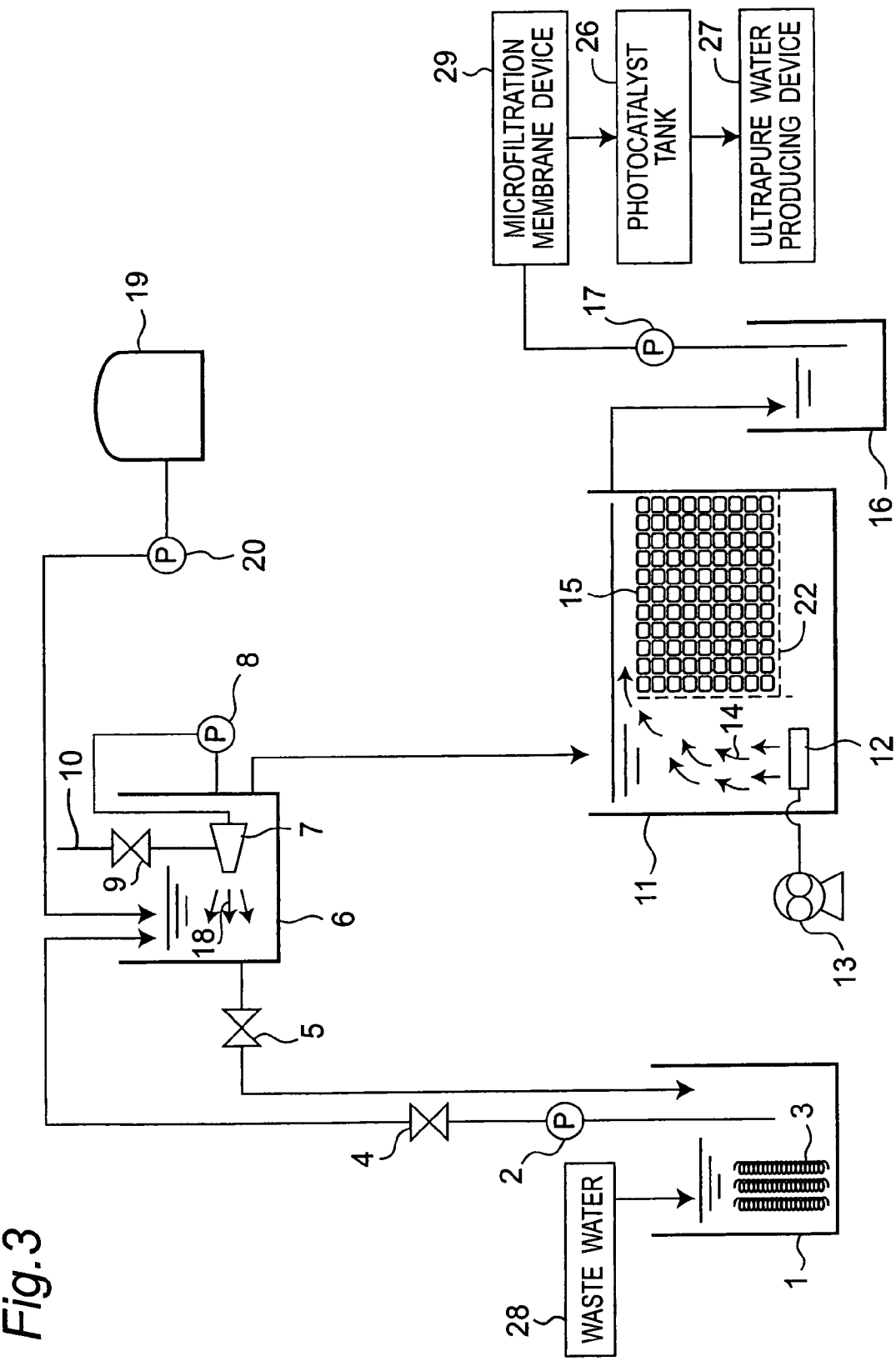
FIG. 3 is a view showing construction of a water treatment apparatus different from those of FIGS. 1 and 2.

FIG. 3 shows the schematic construction of a water treatment apparatus of the present embodiment.

In contrast to the fact that the liquid supplied to the raw water tank 1 has been defined widely as the water 23 in the first embodiment, the liquid is limited to waste water 28 in the present embodiment. Moreover, a microfiltration membrane device 29 is specifically employed as the membrane device 21 of the first embodiment. Furthermore, the photocatalyst tank 26 and the ultrapure water producing device 27 are arranged in this order following the microfiltration membrane device 29.

The components other than the above are the same as in the first embodiment and denoted by the same reference numerals as in the first embodiment with no detailed description provided therefor.

As described above, in the present embodiment, the liquid supplied to the raw water tank 1 is limited to the waste water 28. Therefore, the present embodiment is a water treatment apparatus for the pretreatment of a recycling device of the waste water 28. Furthermore, the microfiltration membrane device 29 is specifically employed as the membrane device 21 of the first embodiment, and the photocatalyst tank 26 and the ultrapure water producing device 27 are arranged in this order following the microfiltration membrane device 29. Therefore, the water 28 to be treated from the charcoal water tank 11 where the organic matters have been treated through decomposition is introduced in order of the microfiltration membrane device 29→the photocatalyst tank 26→the ultrapure water producing device 27.

That is, according to the present embodiment, the water quality is improved by carrying out the pretreatment of the recycling device of the waste water 28 by using the micro-nano bubble technique, and the water 28 to be treated is introduced sequentially into the microfiltration membrane device 29, the photocatalyst tank 26 and the ultrapure water producing device 27.

With the above arrangement, by virtue of the feature that the micro-nano bubbles are maintained for a long time in the water 28 to be treated and the feature that the detergency for the membrane is maintained, the water 28 to be treated that has undergone the pretreatment by the micro-nano bubbles is able to not only prevent the clogging phenomenon of the membrane in the microfiltration membrane device 29 and the ultrapure water producing device 27 but also improve the throughput capacities of the microfiltration membrane device 29 and the ultrapure water producing device 27.

Fourth Embodiment

Figure 4:
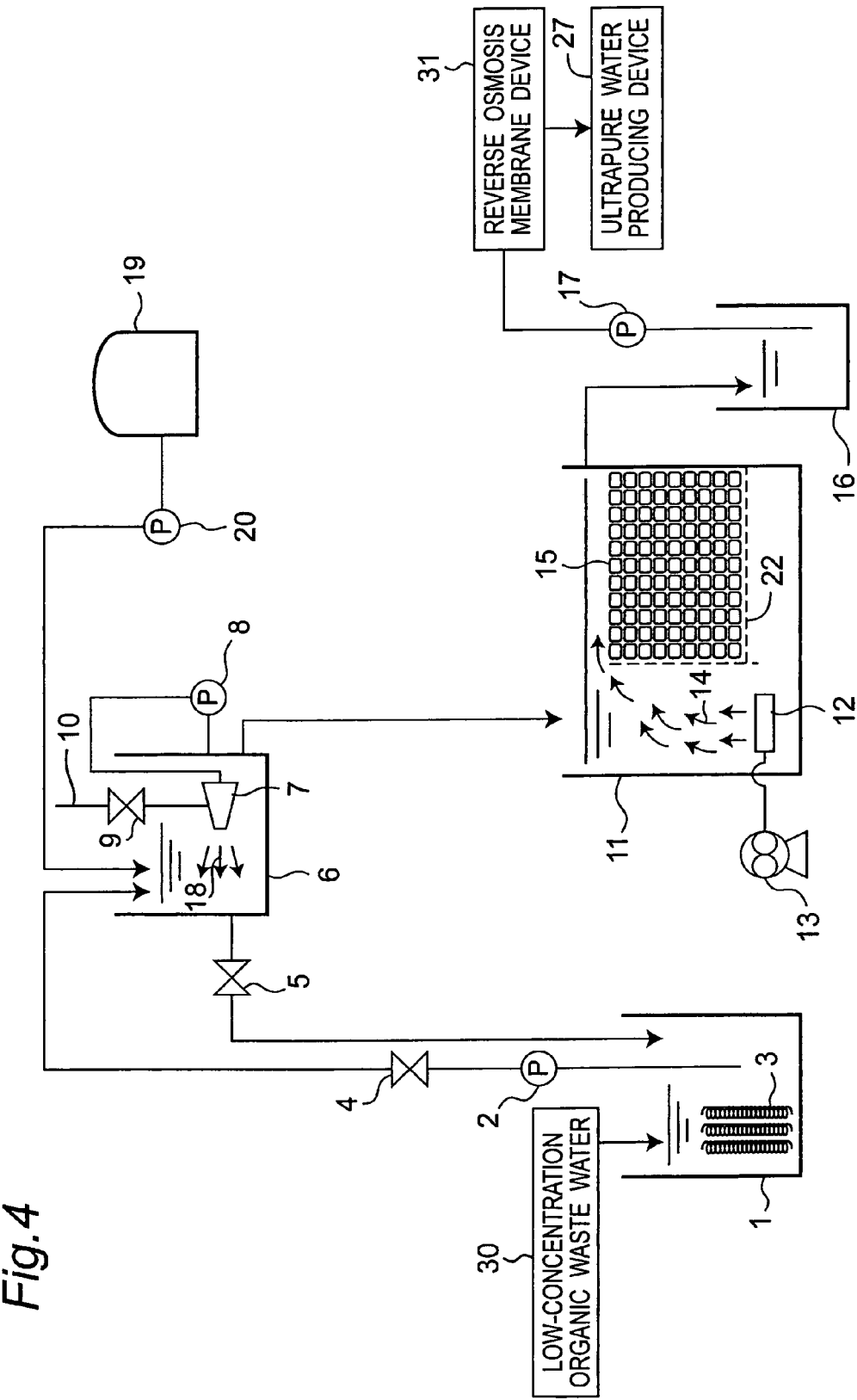
FIG. 4 is a view showing construction of a water treatment apparatus different from those of FIGS. 1 through 3.

FIG. 4 shows the schematic construction of a water treatment apparatus of the present embodiment.

In contrast to the fact that the liquid supplied to the raw water tank 1 has been defined widely as the water 23 in the first embodiment, the liquid is limited to low-concentration organic waste water 30 in the present embodiment. Moreover, a reverse osmosis membrane device 31 is specifically employed as the membrane device 21 of the first embodiment. Furthermore, the ultrapure water producing device 27 is arranged following the reverse osmosis membrane device 31.

The components other than the above are the same as in the first embodiment and denoted by the same reference numerals as in the first embodiment with no detailed description provided therefor.

As described above, in the present embodiment, the liquid supplied to the raw water tank 1 is limited to the low-concentration organic waste water 30. Therefore, the present embodiment is a water treatment apparatus for the pretreatment of a recycling device of the low-concentration organic waste water 30. Furthermore, the reverse osmosis membrane device 31 is specifically employed as the membrane device 21 of the first embodiment, and the ultrapure water producing device 27 is arranged following the reverse osmosis membrane device 31. Therefore, the water 30 to be treated from the charcoal water tank 11 where the organic matters have been treated through decomposition is introduced in order of the reverse osmosis membrane device 31→the ultrapure water producing device 27.

That is, according to the present embodiment, the water quality is improved by carrying out the pretreatment of the recycling device of the low-concentration organic waste water 30 by using the micro-nano bubble technique, and the water 30 to be treated is introduced sequentially into the reverse osmosis membrane device 31 and the ultrapure water producing device 27.

With the above arrangement, by virtue of the feature that the micro-nano bubbles are maintained for a long time in the water 30 to be treated and the feature that the detergency for the membrane is maintained, the water 30 to be treated that has undergone the pretreatment by the micro-nano bubbles is able to not only prevent the clogging phenomenon of the membrane in the reverse osmosis membrane device 31 and the ultrapure water producing device 27 but also improve the throughput capacities of the reverse osmosis membrane device 31 and the ultrapure water producing device 27.

Fifth Embodiment

Figure 5:
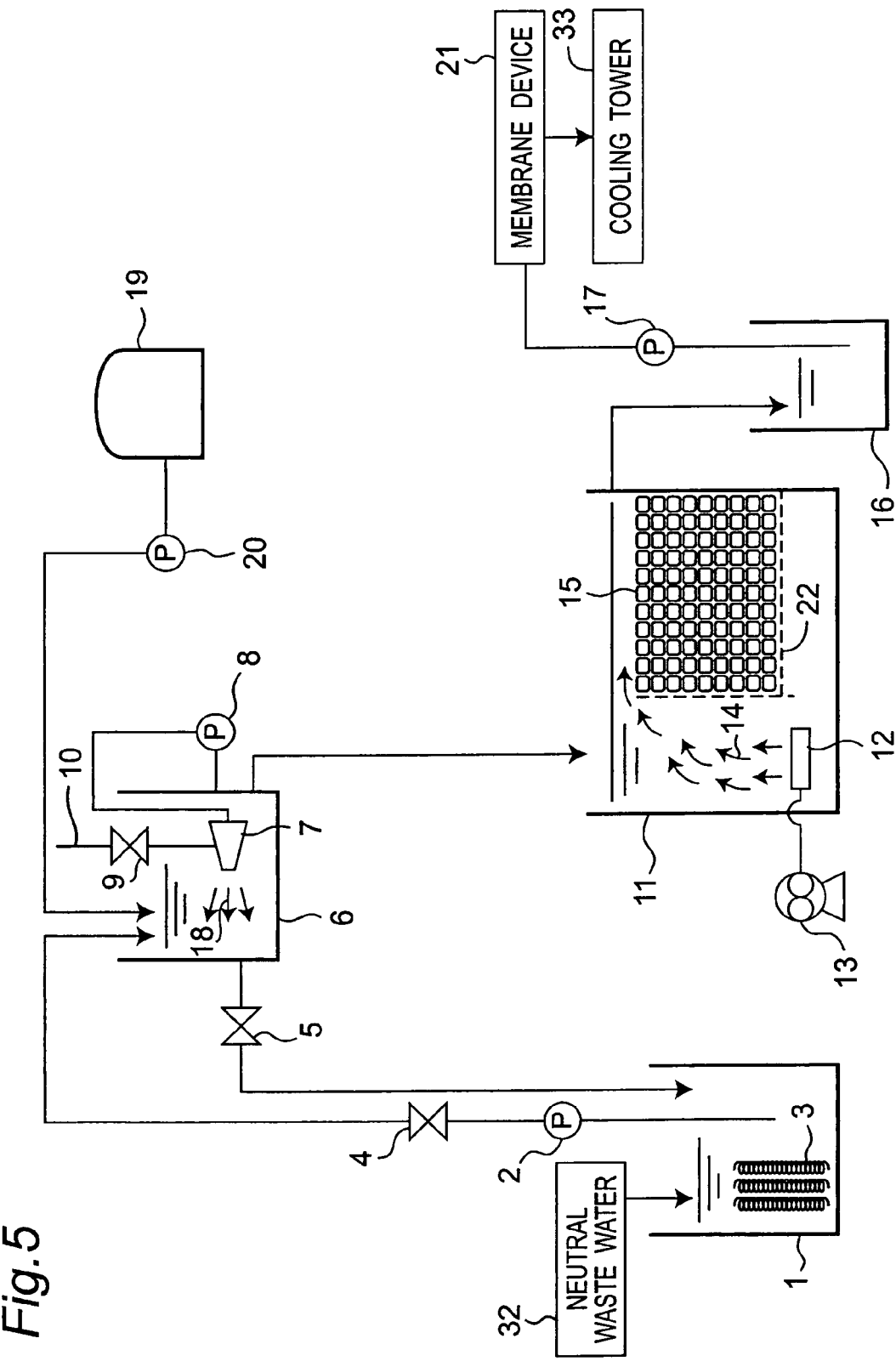
FIG. 5 is a view showing construction of a water treatment apparatus different from those of FIGS. 1 through 4.

FIG. 5 shows the schematic construction of a water treatment apparatus of the present embodiment.

In contrast to the fact that the liquid supplied to the raw water tank 1 has been defined widely as the water 23 in the first embodiment, the liquid is limited to neutral waste water 32 in the present embodiment. Moreover, the water 32 to be treated after being treated by the membrane device 21 of the first embodiment is recycled as a makeup water of a cooling tower 33.

The components other than the above are the same as in the first embodiment and denoted by the same reference numerals as in the first embodiment with no detailed description provided therefor.

As described above, in the present embodiment, the liquid supplied to the raw water tank 1 is limited to the neutral waste water 32. Therefore, the present embodiment is a water treatment apparatus for the pretreatment of a recycling device of the neutral waste water 32. Furthermore, the cooling tower 33 is arranged following the membrane device 21 of the first embodiment. Therefore, the water 32 to be treated from the charcoal water tank 11 where the organic matters have been treated through decomposition is introduced from the membrane device 21 to the cooling tower 33.

That is, according to the present embodiment, the water quality is improved by carrying out the pretreatment of the recycling device of the neutral waste water 32 by using the micro-nano bubble technique, and the water 32 to be treated is introduced sequentially into the membrane device 21 and the cooling tower 33.

With the above arrangement, by virtue of the feature that the micro-nano bubbles are maintained for a long time in the water 32 to be treated and the feature that the detergency for the membrane is maintained, the water 32 to be treated that has undergone the pretreatment by the micro-nano bubbles is able to not only prevent the clogging phenomenon of the membrane in the membrane device 21 but also improve the throughput capacity of the membrane device 21. Furthermore, the micro-nano bubbles are maintained for a long time in the water 32 to be treated that has undergone the pretreatment by the micro-nano bubbles. Therefore, the water to be treated 32 in the cooling tower 33 is maintained in a state in which the water quality is stable.

Sixth Embodiment

Figure 6:
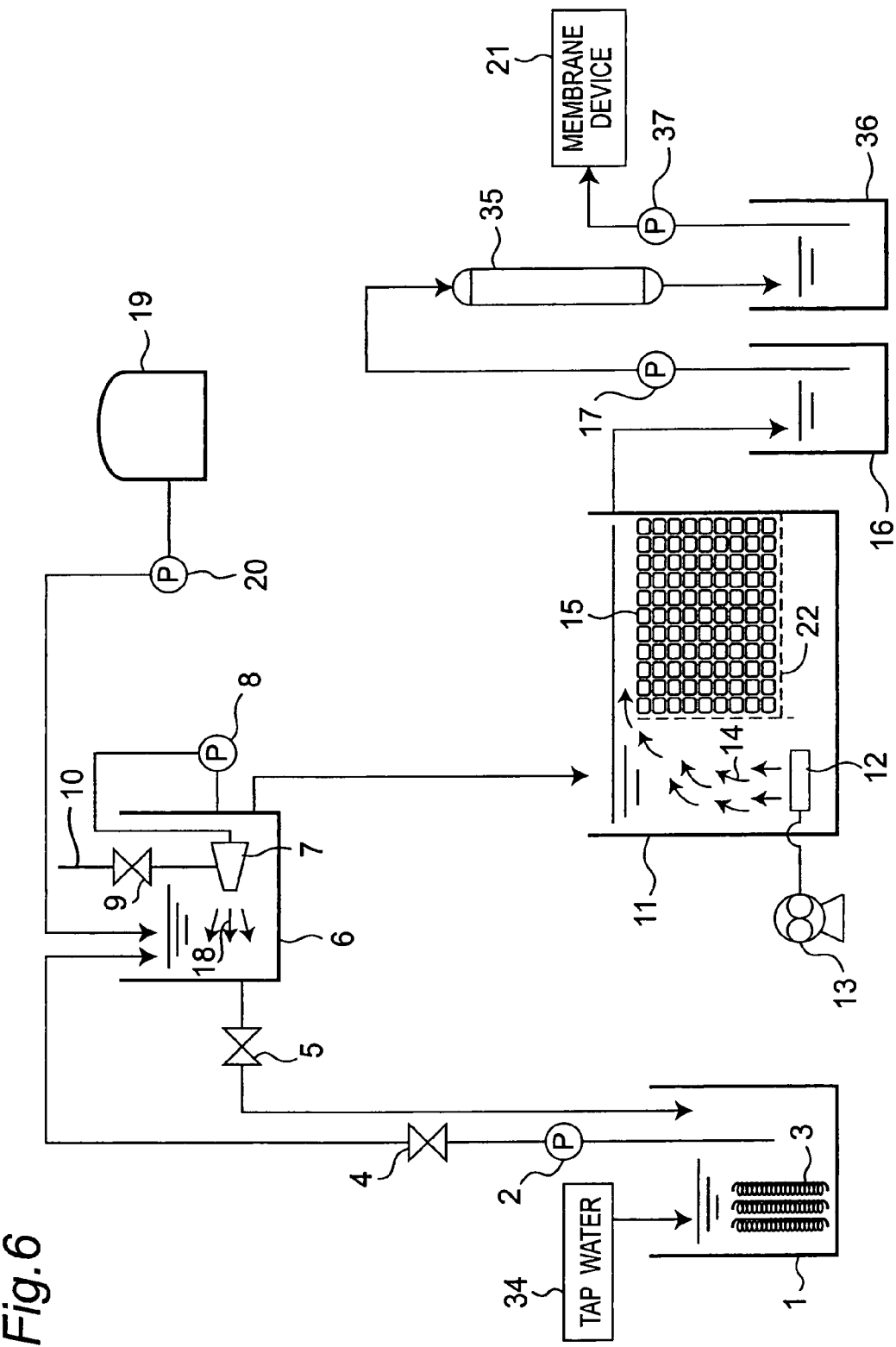
FIG. 6 is a view showing construction of a water treatment apparatus different from those of FIGS. 1 through 5.

FIG. 6 shows the schematic construction of a water treatment apparatus of the present embodiment.

In contrast to the fact that the liquid supplied to the raw water tank 1 has been defined widely as the water 23 in the first embodiment, the liquid is limited to a tap water 34 in the present embodiment. Moreover, an activated carbon absorption device 35 is arranged in a stage subsequent to the pit 16 of the first embodiment, and the water 34 to be treated that has undergone activated carbon absorption treatment in the activated carbon absorption device 35 is once introduced into the pit 36. Then, the water 34 to be treated in the pit 36 is introduced into the membrane device 21 by a pump 37.

The components other than the above are the same as in the first embodiment and denoted by the same reference numerals as in the first embodiment with no detailed description provided therefor.

As described above, in the present embodiment, the liquid supplied to the raw water tank 1 is limited to the tap water 34. Therefore, the present embodiment is a water treatment apparatus for the pretreatment of the tap water 34. Furthermore, the activated carbon absorption device 35 and the pit 36 are arranged in between the pit 16 and the membrane device 21 of the first embodiment. Therefore, the water 34 to be treated from the charcoal water tank 11 where the organic matters have been treated through decomposition is introduced in order of the activated carbon absorption device 35→the membrane device 21.

The tap water 34 is a water of a comparatively good water quality. However, when the water quality is severely demanded, the grade of the water quality of the water 34 to be treated can be improved by arranging the activated carbon absorption device 35 in a stage subsequent to the charcoal water tank 11 as described above.

That is, according to the present embodiment, the water quality is further improved by carrying out the pretreatment of the tap water 34 by using the micro-nano bubble technique, the charcoal and the activated carbon.

With the above arrangement, the micro-nano bubbles are maintained for a long time in the water 34 to be treated that has undergone the pretreatment by the micro-nano bubbles, and therefore, the microorganisms propagating particularly in the activated carbon inside the activated carbon absorption device 35 are further activated. Therefore, the organic matters adsorbed by the activated carbon in the activated carbon absorption device 35 are decomposed by the activated microorganisms, and the activated carbon enters a state as if it were regenerated. Therefore, the activated carbon in the activated carbon absorption device 35 can be regarded as a biological activated carbon that does not need the so-called regeneration.

Moreover, by virtue of the detergency maintained by the micro-nano bubbles for the membrane, the water 34 to be treated that has undergone the pretreatment by the micro-nano bubbles is able to not only prevent the clogging phenomenon of the membrane in the membrane device 21 but also improve the throughput capacity of the membrane device 21.

Seventh Embodiment

Figure 7:
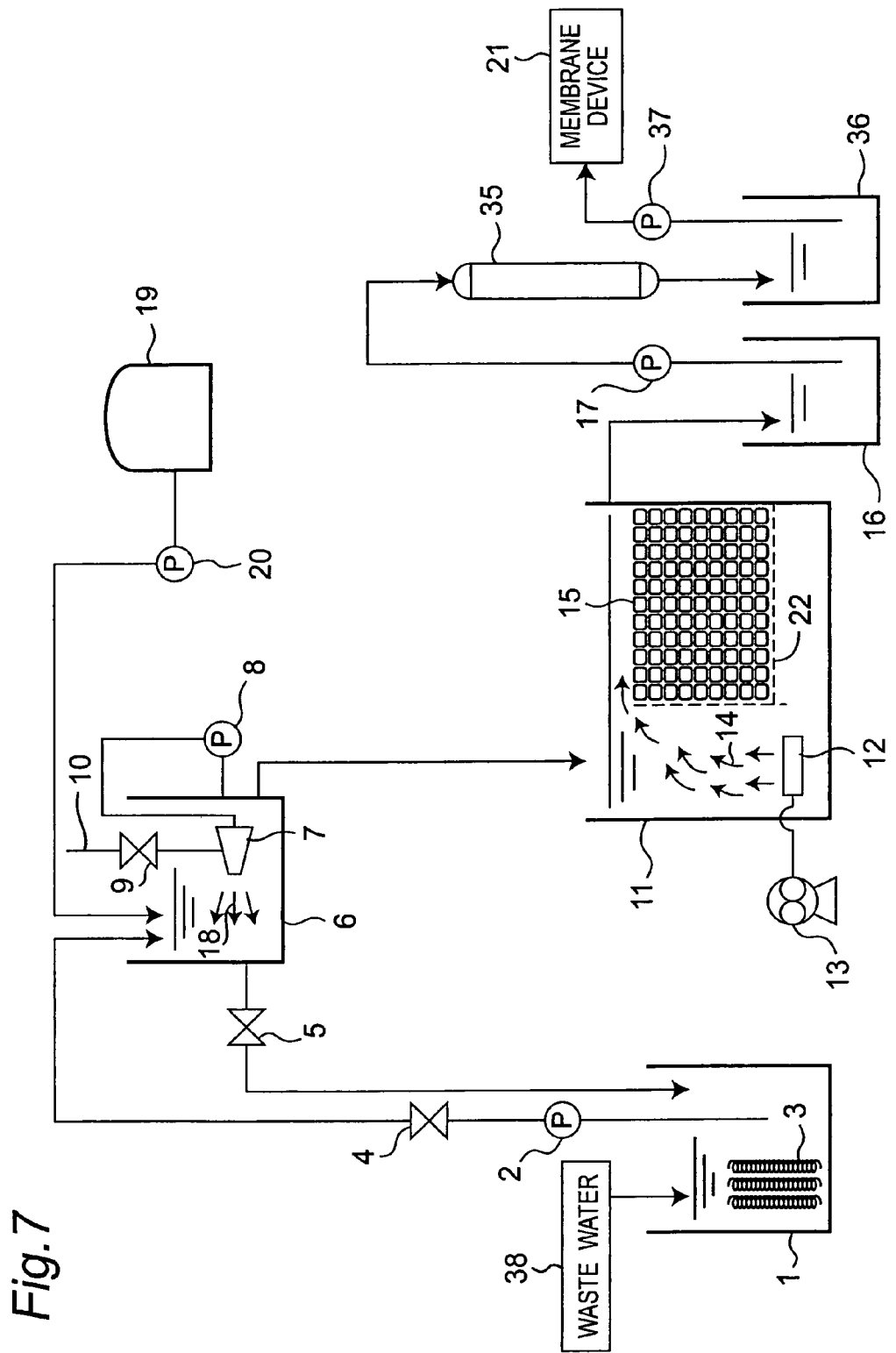
FIG. 7 is a view showing construction of a water treatment apparatus different from those of FIGS. 1 through 6.

FIG. 7 shows the schematic construction of a water treatment apparatus of the present embodiment.

In contrast to the fact that the liquid supplied to the raw water tank 1 has been defined widely as the water 23 in the first embodiment, the liquid is limited to waste water 38 in the present embodiment. Moreover, the activated carbon absorption device 35 is placed as in the case of the sixth embodiment, and the water 34 to be treated that has undergone the activated carbon absorption treatment in the activated carbon absorption device 35 is introduced into the membrane device 21 by the pump 37.

The components other than the above are the same as in the first embodiment and denoted by the same reference numerals as in the first embodiment with no detailed description provided therefor.

As described above, in the present embodiment, the liquid supplied to the raw water tank 1 is limited to the waste water 38. Therefore, the present embodiment is a water treatment apparatus for the pretreatment of the waste water 38. Furthermore, the activated carbon absorption device 35 and the pit 36 are arranged in between the pit 16 and the membrane device 21 as in the case of the sixth embodiment. Therefore, the waste water 38 from the charcoal water tank 11 where the organic matters have been treated through decomposition is introduced in order of the activated carbon absorption device 35→the membrane device 21.

The water quality of the waste water 38 is not better than that of the tap water 34. Therefore, it is necessary to ensure the pretreatment for the waste water 38. Accordingly, as described above, the activated carbon absorption device 35 is arranged in a stage subsequent to the charcoal water tank 11, so that the pretreatment is more reliably carried out by the charcoal 15 and the activated carbon.

That is, according to the present embodiment, the water quality is further improved by carrying out the pretreatment of the waste water 38 by using the micro-nano bubble technique, the charcoal and the activated carbon.

With the above arrangement, the micro-nano bubbles are maintained for a long time in the water 38 to be treated that has undergone the pretreatment by the micro-nano bubbles, and therefore, the microorganisms propagating particularly in the activated carbon inside the activated carbon absorption device 35 are further activated. Therefore, the organic matters adsorbed by the activated carbon in the activated carbon absorption device 35 are decomposed by the activated microorganisms, and the activated carbon enters a state as if it were regenerated. Therefore, the activated carbon in the activated carbon absorption device 35 can be regarded as a biological activated carbon that does not need the so-called regeneration.

Moreover, by virtue of the detergency maintained by the micro-nano bubbles for the membrane, the water 38 to be treated that has undergone the pretreatment by the micro-nano bubbles is able to not only prevent the clogging phenomenon of the membrane in the membrane device 21 but also improve the throughput capacity of the membrane device 21.

Eighth Embodiment

Figure 8:
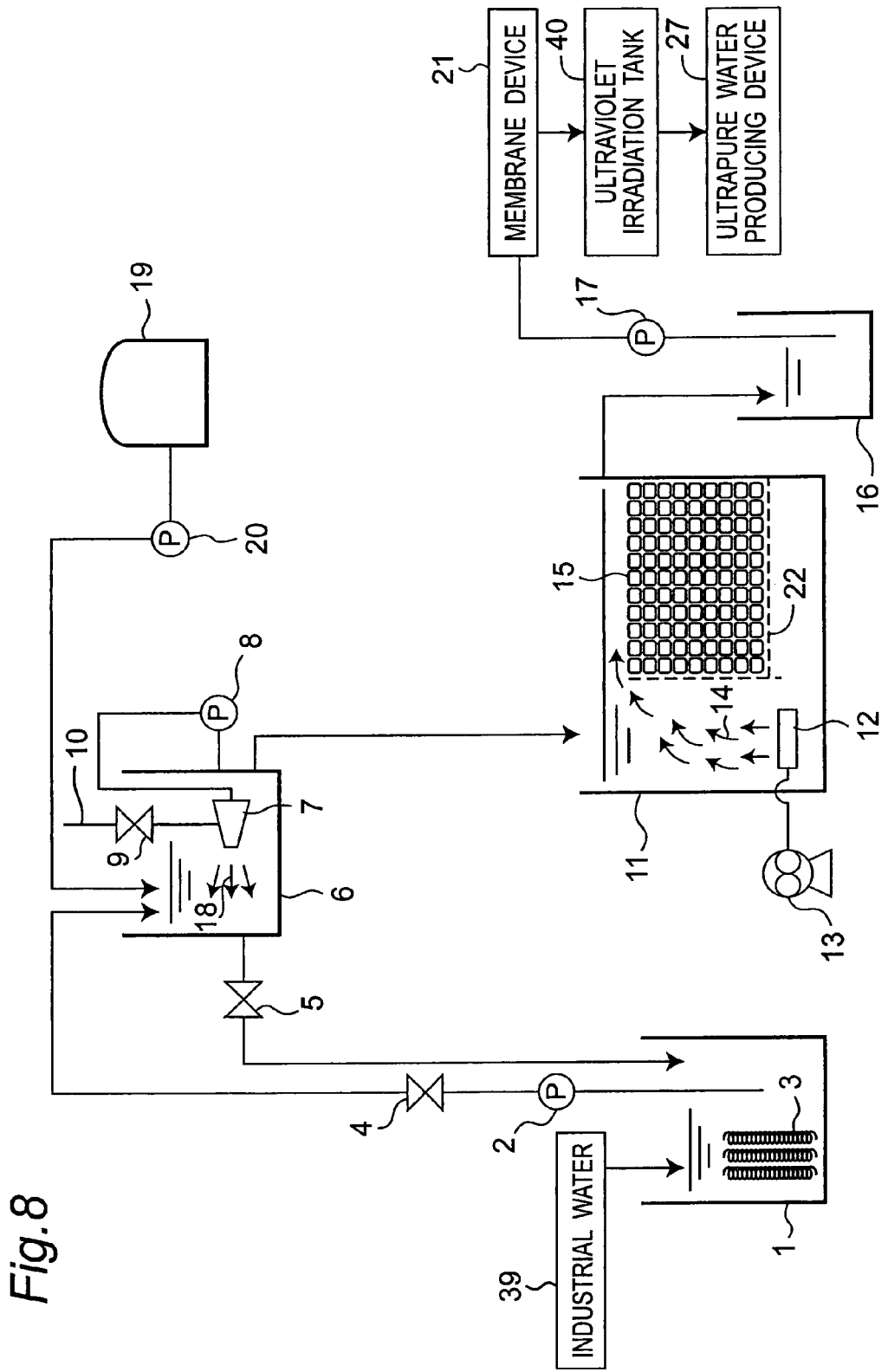
FIG. 8 is a view showing construction of a water treatment apparatus different from those of FIGS. 1 through 7.

FIG. 8 shows the schematic construction of a water treatment apparatus of the present embodiment.

In contrast to the fact that the liquid supplied to the raw water tank 1 has been defined widely as the water 23 in the first embodiment, the liquid is limited to industrial water 39 in the present embodiment. Moreover, an ultraviolet irradiation tank 40 and the ultrapure water producing device 27 are arranged in this order following the membrane device 21 of the first embodiment.

The components other than the above are the same as in the first embodiment and denoted by the same reference numerals as in the first embodiment with no detailed description provided therefor.

As described above, in the present embodiment, the liquid supplied to the raw water tank 1 is limited to the industrial water 39. Therefore, the present embodiment is a water treatment apparatus for the pretreatment of the industrial water 39. Further, the ultraviolet irradiation tank 40 and the ultrapure water producing device 27 are arranged in this order following the membrane device 21 of the first embodiment. Therefore, the water 39 to be treated from the charcoal water tank 11 where the organic matters have been treated through decomposition is introduced in order of the membrane device 21→the ultraviolet irradiation tank 40→the ultrapure water producing device 27.

That is, according to the present embodiment, the water quality is improved by carrying out the pretreatment of the industrial water 39 by using the micro-nano bubble technique, and the water 39 to be treated is introduced sequentially into the membrane device 21, the ultraviolet irradiation tank 40 and the ultrapure water producing device 27.

With the above arrangement, by virtue of the feature that the micro-nano bubbles are maintained for a long time in the water 39 to be treated and the feature that the detergency for the membrane is maintained, the water 39 to be treated that has undergone the pretreatment by the micro-nano bubbles is able to not only prevent the clogging phenomenon of the membrane in the membrane device 21 and the ultrapure water producing device 27 but also improve the throughput capacities of the membrane device 21 and the ultrapure water producing device 27.

Experimental Example

An experimental example of the first embodiment is described below. That is, an experimental apparatus was produced on the basis of FIG. 1. The capacity of the raw water tank 1 of the present experimental device is 300 liters, the capacity of the micro-nano bubble generation tank 6 is 50 liters, and the capacity of the charcoal water tank 11 is 500 liters. Industrial water was introduced as the water 23 into the raw water tank 1, and an ultrafiltration membrane was used as the membrane of the membrane device 21. Further, a micro-nano bubble generation aid obtained by dissolving common salt was introduced into the micro-nano bubble generation aid tank 19 and added to the micro-nano bubble generation tank 6.

The experimental apparatus was operated for about two days, and thereafter, the throughput capacity of the ultrafiltration membrane in the membrane device 21 was measured. As a result, the penetration rate was improved by 20% in comparison with the capacity of the conventional ultrafiltration membrane.

In each of the above embodiments, bincho charcoal is loaded as the charcoal 15 in the charcoal water tank 11. However, since bincho charcoal is recently insufficient, it is acceptable to load a synthetic charcoal that produces the same effect.

What is claimed is:

1. A water treatment apparatus comprising:
    a membrane device (21) that treats introduced water by means of a membrane; and
    a pretreatment device that carries out pretreatment of water to be introduced into the membrane device (21); wherein the pretreatment device comprises:
    a raw water tank (1) which is filled with polyvinylidene chloride filler (3) and into which water is introduced from outside;
    a micro-nano bubble generation tank (6) which has a micro-nano bubble generator (7) that generates micro-nano bubbles including both of micro bubbles and nano bubbles and makes the water introduced from the raw water tank (1) contain the micro-nano bubbles, the bubble generation tank (6) coupled to a micro-nano bubble generation aid-containing tank (19) so as to add aid material to generated bubbles (18);
    a water returning device (5) that sends part of the water in the micro-nano bubble generation tank (6) back to the raw water tank (1) so as to propagate microorganisms activated by the micro-nano bubbles in the polyvinylidene chloride filler (3) in the raw water tank (1), and attach the micro-nano bubbles to the polyvinylidene chloride filler (3); and
    a charcoal water tank (11) which has an agitating device and is filled with a charcoal (15) or a synthetic charcoal such that physical adsorption of organic matters and biological decomposition of the adsorbed organic matters are linked together, wherein the micro-nano bubbles contained in the water introduced from the micro-nano bubble generation tank (6) are attached to the microorganisms propagating in the charcoal (15) or the synthetic charcoal to activate the microorganisms such that the activated microorganisms effectively treat the organic matters in the introduced water through decomposition to prevent clogging phenomenon of the membrane in the membrane device (21) located in a subsequent stage, wherein
    the clogging of the membrane in the membrane device (21) is prevented by the micro-nano bubbles staying in the water to be treated from the charcoal water tank (11).

2. The water treatment apparatus as claimed in claim 1, wherein the micro-nano bubble generation aid is alcohols or salts.

3. The water treatment apparatus as claimed in claim 1, comprising:
    an activated carbon adsorption device (35) in a stage subsequent to the charcoal water tank (11) of the pretreatment device.

4. The water treatment apparatus as claimed in claim 1, wherein
    the membrane device (21) comprises any one of an ultrafiltration membrane device (25), a microfiltration membrane device (29) and a reverse osmosis membrane device (31).

5. The water treatment apparatus as claimed in claim 3, wherein
the membrane device (21) comprises any one of an ultrafiltration membrane device (25), a microfiltration membrane device (29) and a reverse osmosis membrane device (31).

6. The water treatment apparatus as claimed in claim 1, which constitutes part of an ultrapure water producing device of a waste water recycling device.

7. A water treatment method comprising the steps of:
introducing water into a micro-nano bubble generation tank (6) which has a micro and nano bubble generator (7) for generating micro-nano bubbles including both of micro and nano bubbles, is coupled to a source of micro-nano bubble generation aid (19) so as to add aid material to generated bubbles (18) and treating the bubble-containing water in a water tank (11) which is filled with a charcoal (15) or a synthetic charcoal such that physical adsorption of organic matters and biological decomposition of the adsorbed organic matters are linked together, wherein the micro-nano bubbles contained in the introduced water are attached to microorganisms propagating in the charcoal (15) or the synthetic charcoal to activate the microorganisms such that the activated microorganisms effectively treat the organic matters in the introduced water through decomposition to prevent clogging phenomenon of a membrane in a membrane device (21) located in a subsequent stage; and
introducing the water treated by the water tank (11) into the membrane device (21) to prevent the clogging of the membranes in the membrane devices (21) by the micro-nano bubbles staying in the water to be treated from the water tank (11) when carrying out treatment by means of the membrane device (21).

8. The water treatment method as claimed in claim 7, wherein
the membrane device (21) is any one of an ultrafiltration membrane device (25), a microfiltration membrane device (29) and a reverse osmosis membrane device (31).

9. The water treatment method as claimed in claim 7, wherein
the charcoal (15) loaded in the water tank (11) is bincho charcoal, and
the water treated by the membrane device (21) is treated by a photocatalyst tank (26).

10. The water treatment method as claimed in claim 7, wherein
any one of waste water, recycle water and service water before undergoing various treatments is used as the water.

11. The water treatment method as claimed in claim 7, wherein
the charcoal (15) loaded in the water tank (11) is bincho charcoal, and
the water treated by the membrane device (21) is treated by an ultraviolet irradiation tank (40) or an ultraviolet irradiation device.

12. A water treatment method as claimed in claim 7, which constitutes part of an ultrapure water manufacturing method or a waste water recycling method.

* * * * *